UNITED STATES PATENT OFFICE.

ERNEST WM. COOKE, OF CHICAGO, ASSIGNOR TO THE AMERICAN ROLLER BEARING COMPANY, OF WESTERN SPRINGS, ILLINOIS.

LUBRICANT.

SPECIFICATION forming part of Letters Patent No. 455,012, dated June 30, 1891.

Application filed February 21, 1890. Serial No. 341,322. (Specimens.)

*To all whom it may concern:*

Be it known that I, ERNEST WM. COOKE, a citizen of the United States, residing at Chicago, in the county of Cook and State of Illinois, have invented a certain new and useful Lubricant, of which the following is a specification.

My lubricant consists of the following ingredients, combined in the proportions specified, to wit: glycerine, twelve fluid ounces; ferro-cyanide of potassium, ten to thirty grams; powdered graphite, ten to forty grams. These ingredients are thoroughly mixed by grinding or stirring in a mortar.

In using my lubricant I apply it in its liquid form about the parts to be lubricated. This lubricant is particularly adapted for use in cold climates where the use of a solid lubricant is precluded by the temperature. The cyanogen salts of potash or soda in the lubricant serve to harden all surfaces with which said composition is brought in contact.

Having thus fully described my invention, what I claim herein as new, and desire to secure by Letters Patent of the United States, is—

The herein-described composition of matter to be used as a lubricant, consisting of glycerine, cyanogen salts of potash or soda, and powdered graphite, in the proportions specified.

ERNEST WM. COOKE.

In presence of—
   H. HAUPT, Jr.,
   H. KEELER.